US006947502B2

(12) United States Patent
Taylor et al.

(10) Patent No.: US 6,947,502 B2
(45) Date of Patent: Sep. 20, 2005

(54) PARAMETER ESTIMATOR FOR A MULTIUSER DETECTION RECEIVER

(76) Inventors: Matthew A. Taylor, 104 Pond View Rd., Weare, NH (US) 03281; Joshua D. Niedzwiecki, 106 Eastern Ave., Apt. 202, Manchester, NH (US) 03104; Robert B. MacLeod, 12 Valiant La., Nashua, NH (US) 03064

( * ) Notice: Subject to any disclaimer, the term of this patent is extended or adjusted under 35 U.S.C. 154(b) by 534 days.

(21) Appl. No.: 10/228,787

(22) Filed: Aug. 26, 2002

(65) Prior Publication Data

US 2003/0198303 A1 Oct. 23, 2003

Related U.S. Application Data

(60) Provisional application No. 60/372,956, filed on Apr. 16, 2002.

(51) Int. Cl.[7] .......... H04L 27/06

(52) U.S. Cl. .......... 375/340

(58) Field of Search .......... 375/144, 145, 375/148, 149, 267, 340, 346, 347; 370/342, 441

(56) References Cited

U.S. PATENT DOCUMENTS

| | | | | | |
|---|---|---|---|---|---|
| 5,790,606 | A | | 8/1998 | Dent | 375/348 |
| 5,905,721 | A | * | 5/1999 | Liu et al. | 370/342 |
| 5,982,813 | A | | 11/1999 | Dutta et al. | 375/219 |
| 6,122,269 | A | | 9/2000 | Wales | 370/338 |
| 6,198,775 | B1 | | 3/2001 | Khayrallah et al. | 375/265 |
| 6,219,341 | B1 | | 4/2001 | Varanasi | 370/252 |
| 6,240,099 | B1 | * | 5/2001 | Lim et al. | 370/441 |
| 6,831,574 | B1 | * | 12/2004 | Mills et al. | 341/50 |
| 2002/0027985 | A1 | * | 3/2002 | Rashid-Farrokhi | 379/417 |
| 2002/0037061 | A1 | | 3/2002 | Learned | 375/346 |

* cited by examiner

*Primary Examiner*—Don N. Vo
(74) *Attorney, Agent, or Firm*—Pearson & Pearson, LLP

(57) ABSTRACT

A Parameter Estimator for accurately estimating signature responses of multiple co-channel interfering digital transmission signals. The Parameter Estimator is used in a Multiuser Detection (MUD) Receiver to significantly reduce the error rate. The Parameter Estimator comprises a plurality of software components, including a Signature Waveform Estimator, Training Sequence Locator, Noise Estimator, Active Users Tester, Initial Transformation Matrix Builder, a Transformation Matrix Rebuilder, and a Transformation Matrix Selector, and generates an estimated noise power, a training sequence index and estimated signature waveforms.

14 Claims, 10 Drawing Sheets

PARAMETER ESTIMATOR FOR A MULTIUSER DETECTION RECEIVER

CROSS REFERENCE OF RELATED APPLICATIONS

This is a nonprovisional patent application claiming priority of provisional application for patent Ser. No. 60/372,956, filed Apr. 16, 2002.

STATEMENT OF GOVERNMENT INTEREST

This invention was made with the support of the United States Government. The United States Government may have rights in this invention.

BACKGROUND OF THE INVENTION

1. Field of the Invention

This invention relates to a multiuser communication system and in particular to a multiuser detection (MUD) receiver for jointly demodulating co-channel interfering digital signals using estimates of the parameters of each individual signal, as distorted by their unique propagation channels, such estimates being generated by a parameter estimator.

2. Description of Related Art

Prior art methods for multiuser detection are included in the textbook "Multiuser Detection, Cambridge University Press, 1998 by Verdu. Verdu describes several different types of multiuser detectors, but assumes that the parameters of the individual signals are known a priori, and that the signature waveforms (one of the required parameters) do not extend past the symbol boundaries.

Other prior art methods for multiuser detection are described in U.S. patent application Ser. No. 09/923,709, filed by Rachel Learned et al. on Aug. 7, 2001, entitled "Method for Overusing Frequencies to Permit Simultaneous Transmission of Signals From Two or More Users on the Same Frequency and Time Slot", and in U.S. patent application Ser. No. 09/943,770, filed by Rachel Learned on Mar. 28, 2002, entitled "Systems for Parameter Estimation and Tracking of Interfering Digitally Modulated Signals". These patent applications estimate the parameters by assuming that signals are added to the propagation channel one at a time, but give no method for estimating parameters when the channel is always occupied by multiple users. In addition, Learned makes the assumption that the shape of the signature waveform is known, although it is often unknown due to multipath and other dispersive channel propagation effects.

U.S. Pat. No. 5,790,606 issued Aug. 4, 1998 to Paul W. Dent and assigned to Ericsson Inc., of North Carolina, entitled "Joint Demodulation Using Spatial Maximum Likelihood" discloses a type of multiuser communication system that uses several antennas which receive overlapping co-channel transmissions from several users (i.e. cell phones). Unfortunately, Dent's design will not work when the bit transitions of the various co-channel transmitters are not aligned in time at every antenna (a virtually impossible condition to meet). In virtually all real world applications, the digital signal is passed through a filter, which smoothes the rectangular digital signal and extends its influence into neighboring symbols. This intersymbol interference (ISI) then must be accounted for when attempting to jointly demodulate a co-channel aggregate signal. In addition, ISI can also be caused by multipath and other dispersive channel propagation effects. These effects are normally mitigated through the use of adaptive equalizers, but these equalizers do not work in the co-channel interfering signal case. The second drawback of this approach is that it requires multiple (and usually a large number) of antennas.

U.S. Pat. No. 6,122,269, issued to Wales on Sep. 19, 2000 performs multiuser detection and parameter estimation for a packet radio application. This procedure uses MUD to jointly demodulate packets that have unintentionally collided in time. The procedure uses known symbol sequences to solve for the unknown channel impulse response coefficients, and a correlation process to locate the positions of the known symbol sequences. In the case of short "snapshots" (vectors of received waveform samples), the correlation process will produce noisy data, and inaccurate known symbol sequence position estimates. In addition, the waveforms correlated against do not include the (unknown) channel impulse response, and will therefore also be adversely affected by leaving those out of the correlation equation. In addition, there is no mention of a method to determine the number of users which are colliding at any given time, and which users are colliding (as identified by their unique known symbol sequences).

SUMMARY OF THE INVENTION

Accordingly, it is therefore an object of this invention to provide a means for accurately estimating signature waveforms for multiple co-channel interfering digital signals.

It is also an object of this invention to accurately estimate the location of training sequences in the received signal, estimate the average noise power in the signal and accurately estimate which users are transmitting for any given snapshot of the received signal.

It is an object of this invention to provide a communication system having a multiuser detection receiver with a parameter estimator to accurately estimate the signature waveforms for multiple co-channel interfering digital signals.

It is a further object of this invention to provide a method of parameter estimation that does not require each user's transmission to be exactly synchronized in time, and instead they only have to be close enough so that they are not shifted more that the width of the Training Sequence Locator sliding search windows.

It is another object of this invention to significantly reduce the error rate in a multiuser detection (MUD) receiver.

These and other objects are accomplished by a parameter estimator of a multiuser detection receiver comprising means for estimating a location index ($\tau_{TS}$) of the composite training sequence in each frame of a received baseband signal, means for calculating an estimate of the average noise power ($\hat{\sigma}(p)^2$) in the received baseband signal in accordance with the training sequence location index ($\tau_{TS}$) input, means for estimating the signature waveforms ($s_k(n, p)$) unique to each user (k) and each diversity port (p) in the received baseband signal in accordance with the training sequence location index ($\tau_{TS}$) input and the transformation matrix ($\underline{\underline{T}}_r$) input, means coupled to an output of the estimate of an average noise power calculating means and to an output of the signature waveforms estimating means, for determining the number of active users; and means, coupled to the means for determining the number of active users and to prestored known training sequences for each user, for generating the transformation matrix ($\underline{\underline{T}}_r$) to send to the signature waveform estimating means. The means for calculating an estimate of an average noise power in the received baseband signal comprises training sequence selector means for selecting the composite training sequences ($\hat{\beta}_m(n, p)$) in each frame (m) of the received baseband signal (r(n,p)) in accordance with the training sequence index ($\tau_{TS}$) and a known number of samples per frame of the received baseband signal, a first averager means for determining an average ($\hat{\beta}(n, p)$) of the composite training sequences ($\hat{\beta}_m(n, p)$), means for subtracting the average ($\hat{\beta}(n, p)$) of the composite training sequences from the estimate of composite training sequences $\hat{\beta}_m(n, p)$ to obtain an estimated noise signal, means for calculating a variance of each noise signal for estimating the average noise power in each frame, and a second averager coupled to an output of the variance calculating means for determining the estimate of an average noise power from the average noise power in each frame (m). The means for estimating signature waveforms unique to each user in the received baseband signal comprises means for selecting the received composite training sequence in each frame of the received baseband signal, and means for multiplying this received composite training sequence in each frame by the transformation matrix to obtain the estimated signature waveforms. The transformation matrix comprises an initial transformation matrix built from pre-stored known training sequences for each user for an initial matrix multiplication calculation, and the transformation matrix on subsequent matrix multiplication calculations is determined by a transformation matrix rebuilder receiving signature estimates of active users. The means for generating the transformation matrix comprises means, coupled to a memory, for building an initial transformation matrix ($\underline{\underline{T}}_{r_1}$) in response to the pre-stored known training sequences for each user, means for rebuilding the transformation matrix ($\underline{\underline{T}}_r$) in response to an output of the active users determining means, and means coupled to the initial transformation matrix generator and the transformation matrix rebuilder for selecting a transformation matrix to send to the signature waveform estimating means. The multiuser detection receiver comprises means for storing the known training sequence for each user.

The objects are further accomplished by a multiuser communication system comprising a plurality of user transmitters transmitting co-channel interfering signals, a receiver having means for receiving a composite waveform signal from the plurality of user transmitters, the receiver further comprises means for converting the received composite waveform signal to a received baseband signal, means, coupled to the received baseband signal, for generating estimated signature waveforms of each user (k) for each diversity port (p) by using the received baseband signal from each diversity port in accordance with known training sequences of each of the plurality of user transmitters, means for storing the known training sequence of each of the plurality of user transmitters, and means for demodulating the received baseband signal in accordance with information received from the estimated signature waveform generating means to generate symbols for each of the plurality of user transmitters. The receiver comprises a single polarized antenna. The receiver may comprise a dual polarized antenna for reducing symbol error rate, and each polarized port of the antenna comprises the means for converting the received composite waveform signal to a received baseband signal. The receiver may also comprise at least two polarized antennas, each of the antennas having either a single polarization or a dual polarization for reducing symbol error rate, and each polarized port of each of the antennas comprises means for converting the received composite waveform signal to a received baseband signal.

The objects are further accomplished by a method of estimating parameters of a received baseband signal in a multiuser detection receiver comprising the steps of estimating a training sequence location index in each frame of the received baseband signal, estimating signature waveforms unique to each user in each received baseband signal in response to the training sequence location index and a transformation matrix, determining a number of active users with means coupled to outputs of the average noise power and an estimation of the signature waveforms unique to each user in the receive baseband signal, and generating the transformation matrix with first means coupled to outputs of the number of active users determining means and second means coupled to outputs of prestored known training sequence. The step of generating the transformation matrix comprises the steps of building an initial transformation matrix in response to the prestored known training sequences for each user for use during a first iteration of a signature estimation loop, rebuilding the transformation matrix in response to an output from the number of active users determining means for use during subsequent iterations of the signature estimation loop, and selecting a transformation matrix from the initial transformation matrix iteration or the rebuilt transformation matrix iterations of the signature estimation loop, to feed to the means for estimating signature waveforms unique to each user.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which.

DESCRIPTION OF THE ILLUSTRATIVE EMBODIMENTS

Figure 1:
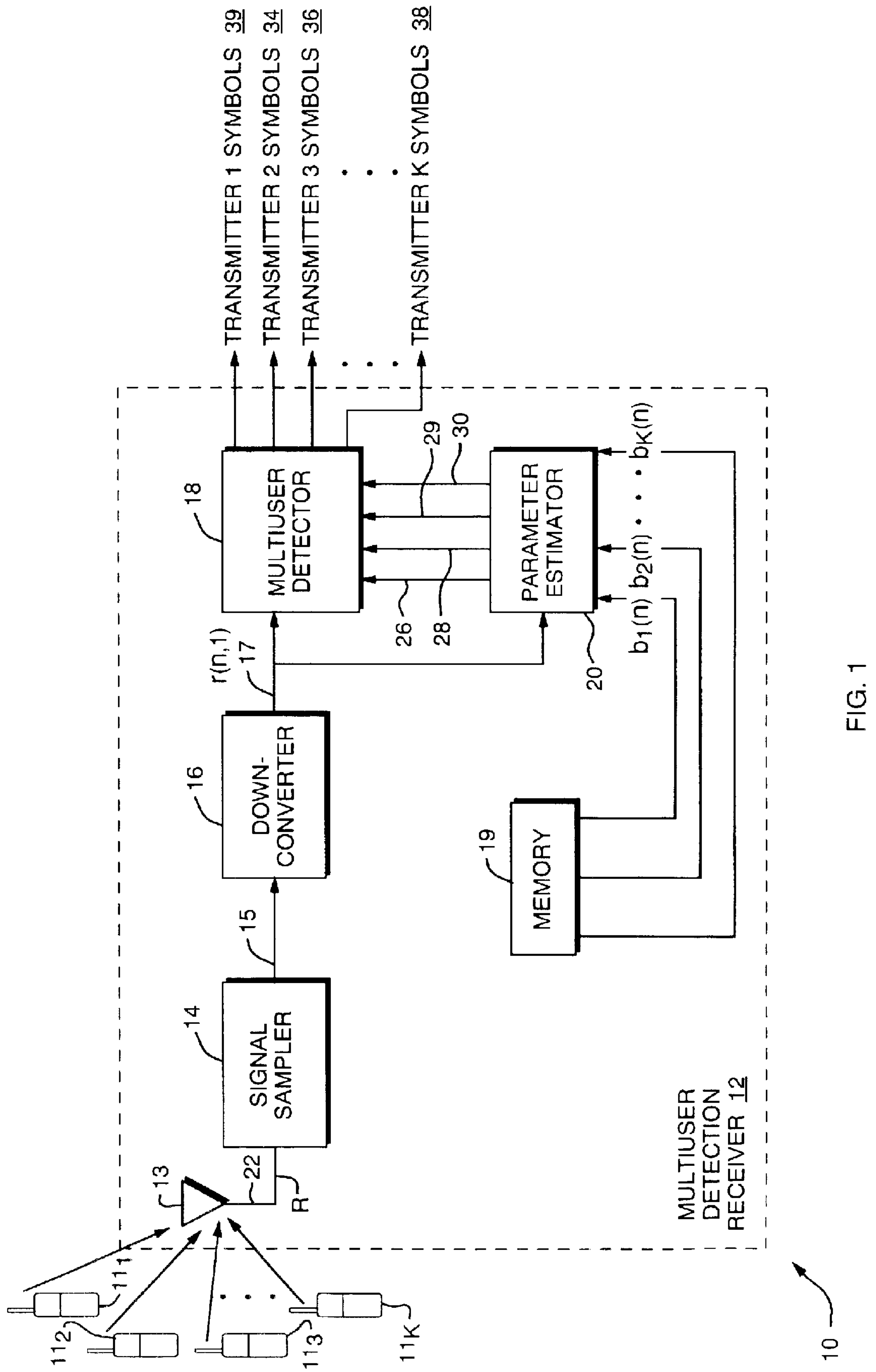
FIG. 1 is a system block diagram of a Communication System having a Multiuser Detection (MUD) Receiver, which includes the invention of a Parameter Estimator.

Referring to FIG. 1, a system block diagram is shown of a Communication System 10 comprising a Multiuser Detection (MUD) Receiver 12 and a plurality of User Transmitters $\mathbf{11}_1$ to $\mathbf{11}_K$ which are all simultaneously transmitting co-channel, interfering digital signals, all on the same frequency, all using the same type of modulation scheme such as digital phase shift key (PSK) or quadrature amplitude modulated (QAM) signals, with the same nominal data rate. Each of the User Transmitters $\mathbf{11}_1$ to $\mathbf{11}_K$ has a unique, known training sequence. The training sequences are roughly aligned as received at a Receiver Antenna 13, so that the training sequences mostly overlap. This type of synchronization is normally provided in communication systems through the use of a synchronization signal transmitted from a unit co-located with the MUD receiver 12. Alignment of the symbol transitions is not required. A Table at the end of the Description summarizes the nomenclature used herein.

The MUD Receiver 12 comprises the Antenna 13, a Signal Sampler 14, and a Downconverter 16, and the output (baseband signals) of the Downconverter 16 are fed to a Multiuser Detector 18 and a Parameter Estimator 20 which estimates the signature waveforms for each user.

K signals from the User Transmitters $\mathbf{11}_1$ to $\mathbf{11}_K$ are received by the Antenna 13 as the sum of the signals from Transmitters $\mathbf{11}_1$ to $\mathbf{11}_K$. The Antenna 13 is a singly polarized antenna with a single connection to the Signal Sampler 14. This connection is made by a transmission line or Waveguide 22 that connects from one Antenna 13 to one Signal Sampler 14.

The Signal Sampler 14 may be embodied by an analog-to-digital converter (A/D). The output of the Signal Sampler 14 is a Snapshot 15 of the sampled waveform (R) received from the antenna 13 and this Snapshot 15 is composed of at least the number of samples in two frames of data. Alternately, the snapshot 15 may be composed of the number of samples in several frames of data. The Snapshot 15 is fed to a Downconverter 16, which is typically used in digital radios to translate the frequency of the received signal, R, to baseband. The output 17 of the Downconverter 16 is a complex baseband signal, r(n,l), which contains information from all K co-channel interfering signals in the same frequency and time space.

The baseband signal, r(n,l), is sent to the Parameter Estimator 20. The Multiuser Detector 18 jointly demodulates the co-channel interfering digital signals, using information provided by the Parameter Estimator 20. The Parameter Estimator 20 uses knowledge of the unique training symbols transmitted by User Transmitters $\mathbf{11}_1$ to $\mathbf{11}_K$, and contained in the composite received signal r(n,l) to solve for the signature waveforms of the K signals. The term "signature waveform" is herein used to denote the impulse response of the channel through which the signal passes. The term "channel" is used herein to include not only the propagation channel and antenna effects, but also any filtering used in the transmitters $\mathbf{11}_1$ to $\mathbf{11}_K$ and Receiver 12 front end. In addition, in a direct sequence spread spectrum system, it would also include the spreading code.

The optimal Multiuser Detector 18 is one that minimizes the mean square error between the received signal and all possible combinations of each users transmitted data symbols transformed by their unique signature response. This optimal Multiuser Detector 18 is expressed mathematically as follows:

$$\hat{d}_{ML} = \underset{d\in\Omega}{\arg\min}\left\{E\left\{\left\|r(n,\,p) - \sum_{k=l}^{K} d_k(n) * s_k(n,\,p)\right\|^2\right\}\right\} \tag{1}$$

where Ω=the constraint set of all possible combinations of transmitted data symbols.

The purpose of the Parameter Estimator 20 is to supply the Multiuser Detector 18 with the information needed to solve this equation. The most important is the Signature Waveforms 30, unique to each user and each diversity port. The Signature Waveforms 30 describe the transformation of each users transmitted symbols as they propagate from Transmitters $\mathbf{11}_1$ to $\mathbf{11}_K$ to Receiver 12. This includes pulse shape filtering on the Transmitters $\mathbf{11}_1$ to $\mathbf{11}_K$ and receiver filtering on the Receiver 12. Some multiuser detectors may also require information about the location of the training sequence in each frame of data for synchronization, and they may also require information about the noise power in the received signal to make better estimates of the transmitted symbols for each user. The Parameter Estimator 20 described herein calculates each one of these parameters, and therefore, will operate with any Multiuser Detector 18 that requires these inputs.

The Parameter Estimator 20 generates outputs, which occur once per snapshot and contain parameter estimates for each frame of data in that snapshot. These parameter estimates include an estimated signature waveforms 30, $\hat{s}_{k\alpha}$(n, p, m), for each diversity port (p), frame (m), and active user ($k_\alpha$). The outputs also include an estimated noise power 26 $\sigma^2$(p) , which is a scalar that represents the average power of the noise and a training sequence index 28, $\tau_{TS}$, which is a pointer to the location of the training sequence in each frame of the snapshot 15. The outputs also include an active users vector 29 (u(k)) that contains the state of each user, k. State refers to the user being "actively transmitting" or "not transmitting". The outputs of the Parameter Estimator 20 are sent to the MUD 18, which also receives the r(n,l) baseband signal 17, and produces separate streams of transmitter 1 symbols 39 to transmitter K symbols 38 for signal 1, signal 2, up to signal K which correspond to each of the K co-channel interfering signals sent by Transmitters $\mathbf{11}_1$ to $\mathbf{11}_K$.

Figure 2:
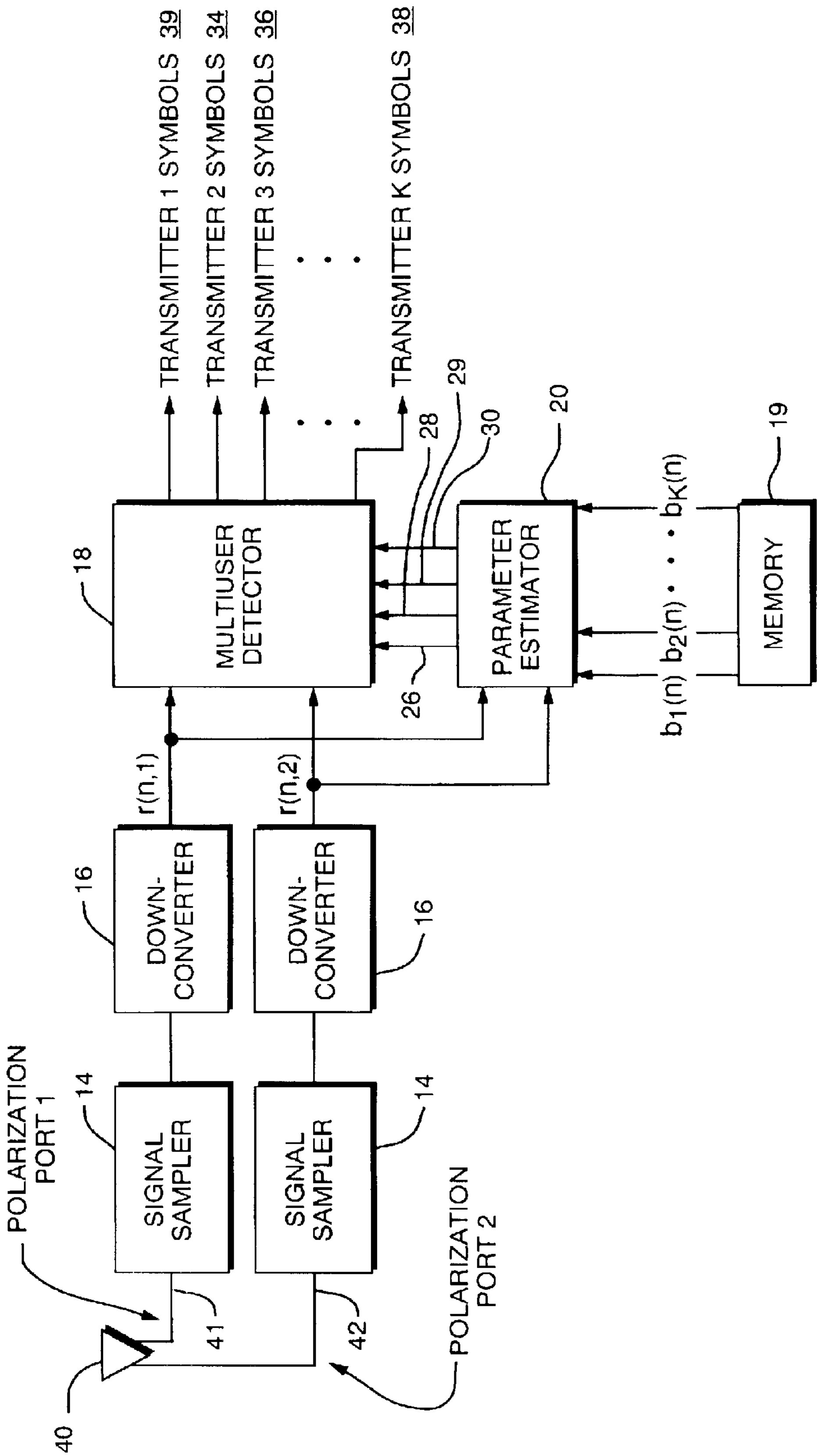
FIG. 2 is a block diagram of a first alternate embodiment of the Communication System of FIG. 1 having a dual polarized antenna.

Referring now to FIG. 2, a block diagram is shown of a first alternate embodiment of the Communication System 10 of FIG. 1 having a Dual Polarized Antenna 40. The inclusion of a Dual Polarized Antenna 40 provides more information to the Multiuser Detector 18, to make better symbol decisions, thereby reducing the symbol error rate. This extra information derives from the fact that the signals received by orthogonally polarized antenna ports travel through effectively different channels. The Parameter Estimator 20 will provide to the Multiuser Detector 18 the signature waveforms for each user "k" received by both antenna ports (p=1,2). Hence, there will be K×2 signature waveforms passed to the Multiuser Detection 18. Therefore, the Multiuser Detector 18 will have twice as many equations compared to only one polarization, but the same number of symbols to solve for.

The use of a dual polarized antenna will be of benefit in the following two cases: first, where the signal is transmitted in dual orthogonal polarizations, and second, where electromagnetic scattering causes significant cross polarized energy to be received at the receive antenna, even though only one polarization was transmitted.

Figure 3:
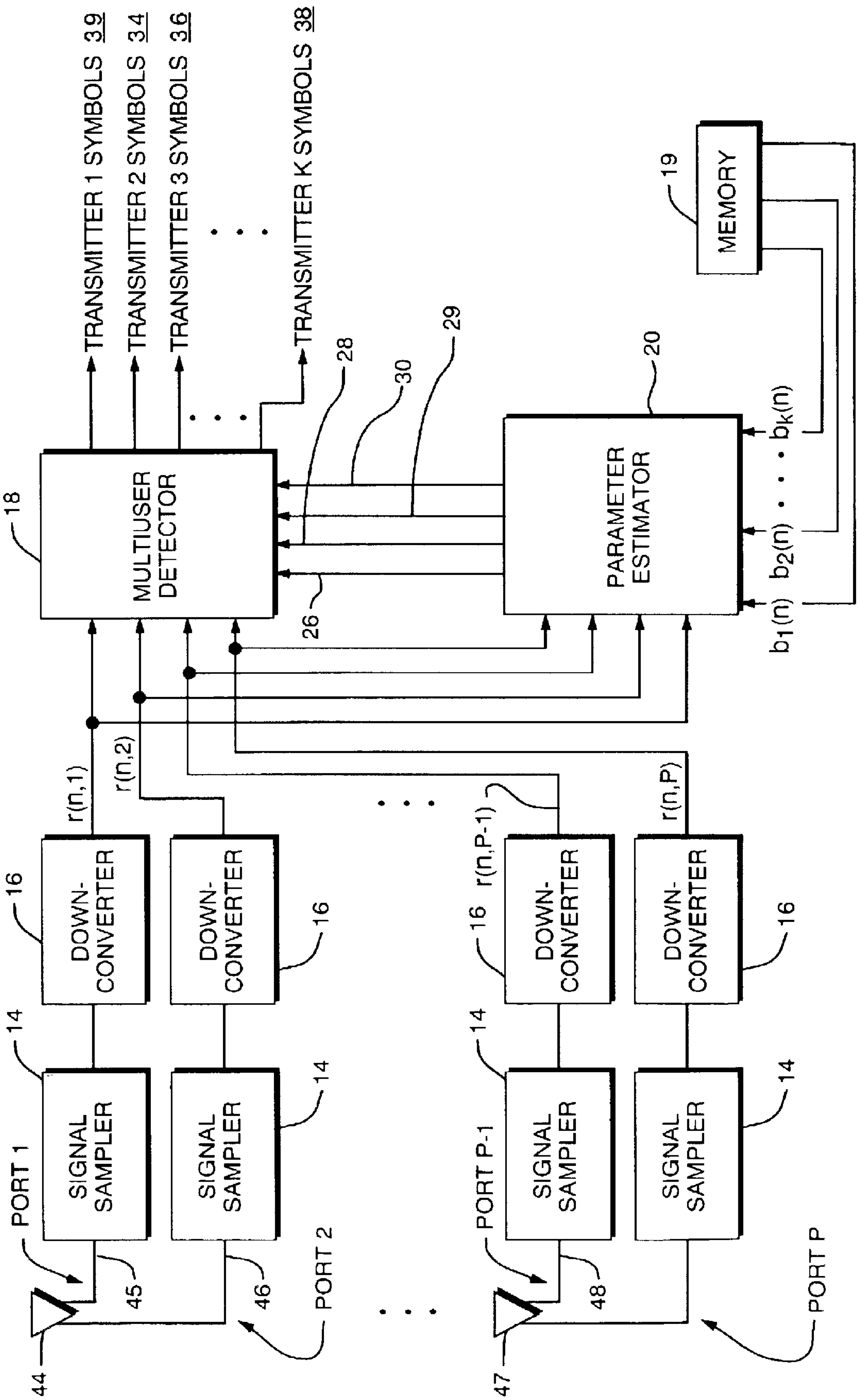
FIG. 3 is a block diagram of a second alternate embodiment of the Communication System of FIG. 1 comprising more than one antenna, each antenna having one or two polarizations.

Referring to FIG. 3, a block diagram is shown of a second alternate embodiment of the Communication System 10 of FIG. 1 comprising more than one antenna, each antenna having one or two polarizations. The inclusion of extra antenna ports provides even more information to the Multiuser Detector 18, enabling the Multiuser Detector 18 to make better symbol decisions, thereby reducing the symbol error rate. In order to provide added benefit, the extra antennas must be space diverse. In other words, the antennas must be spaced far enough apart that they provide a significantly different propagation channel. In this case, the Parameter Estimator 20 processes, the signal r(n,p) where p=1, 2, . . . ,P and produces K×P signature waveforms to pass to MUD 18.

Figure 4:
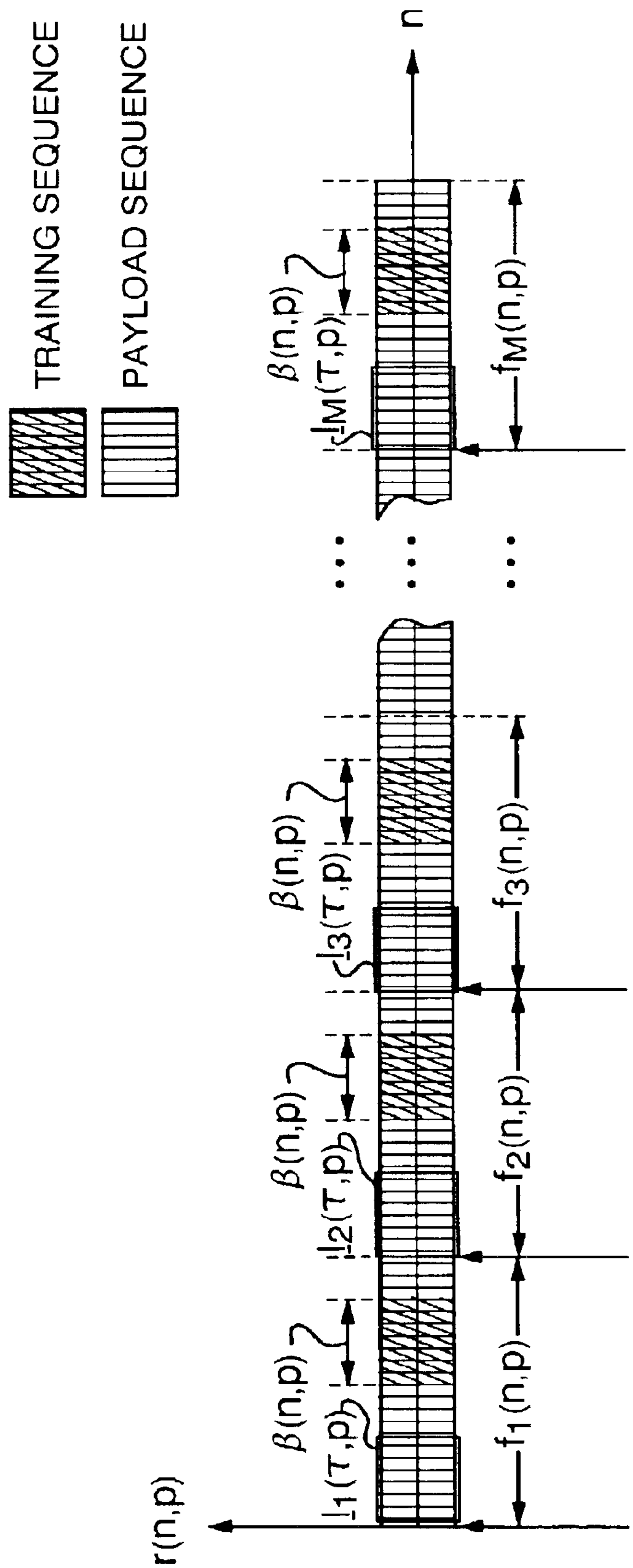
FIG. 4 is a diagram of the frame structure underlying the received baseband signal r(n,p) for the case of two or more co-channel interfering signals for a given diversity port signal "p", showing a sequence of framed segments $f_m(n,p)$ having a training sequence $\beta(n,p)$ within each framed segment and also shows training sequence sliding search windows ($\underline{l}_m(\tau,p)$) for use in the training sequence locator.

Referring to FIG. 4, a diagram is shown of the frame structure underlying r(n,p) for the case of multiple (K) co-channel interfering signals for a given diversity port signal "p" showing a sequence of framed segments, $f_m(n,p)$, having a received composite training sequence, β(n,p), at the same location of each frame segment. The received composite training sequence, β(n,p), is defined as the complex baseband version of the sum of each users training sequence, $b_k(n)$, convolved (indicated by an asterisk) with its respective signature waveform, $s_k(n,p)$, plus additive white gaussian noise, w(n,p). This relation is defined mathematically as follows:

$$\beta(n,p)=\sum_{k-1}^{K} b_k(n)*s_k(n,p)+w(n,p) \tag{2}$$

Figure 6:
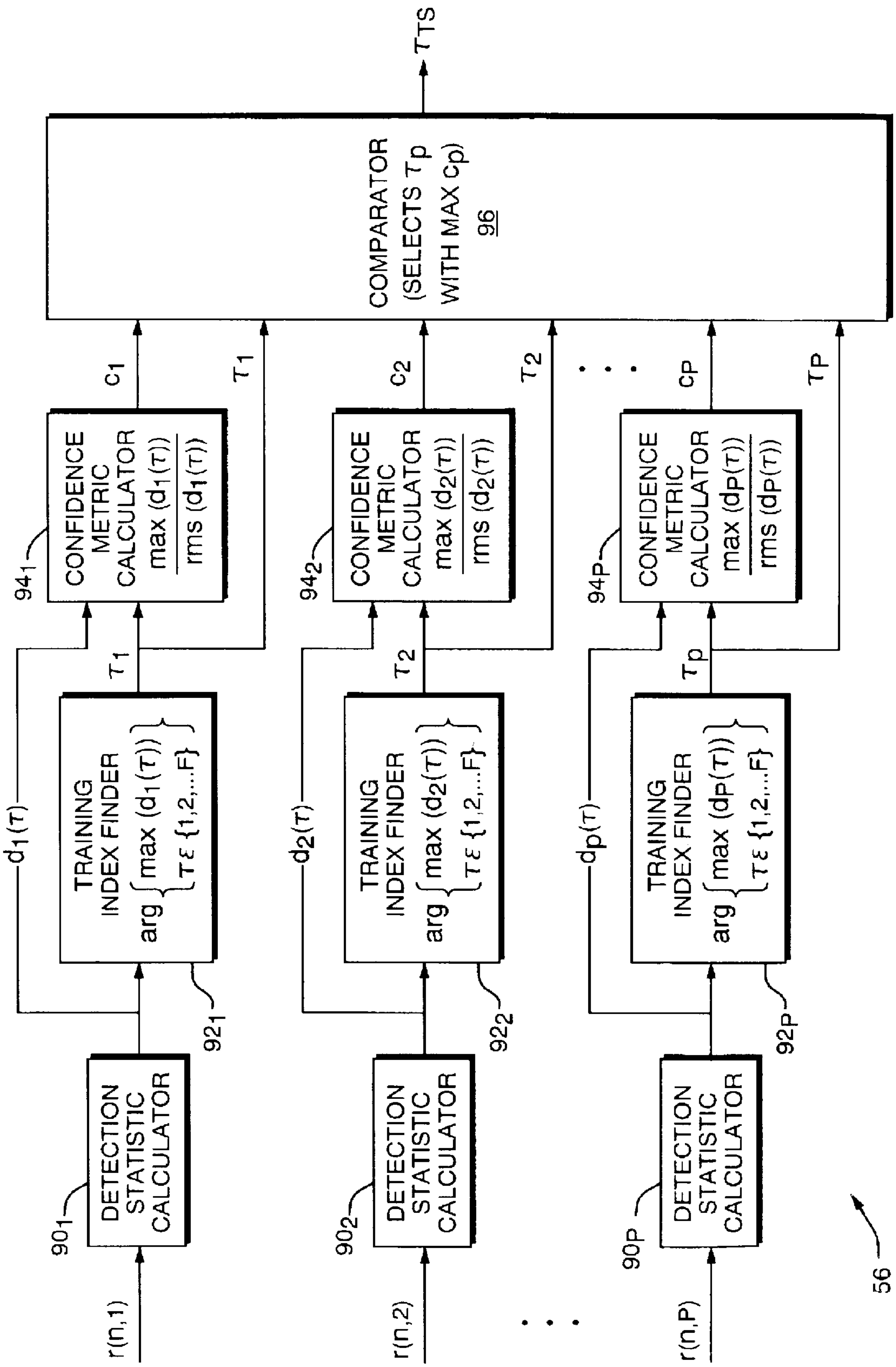
FIG. 6 is a flow chart of the Training Sequence Locator component.

FIG. 4 also shows the training sequence sliding search windows, $\underline{l}_m(\tau,p)$, that are used by the Detection Statistic Calculator $\mathbf{90}_p$, which is part of the Training Sequence Locator 56 (FIG. 6). These sliding search windows are L samples long where L is the number of samples in a received composite training sequence, β(n,p). The first index of each sliding search window is separated by F samples where F is the number of samples in a frame of data. Each sliding search window, $\underline{l}_m(\tau,p)$, is moved across a corresponding frame of received data, $f_m(n,p)$, shifted one sample at a time for a total of F sample shifts. For each sample shift, τ, the data in each sliding search window, $\underline{l}_m(\tau,p)$, is used by the Detection Statistic Calculator 90 to calculate the corresponding value of the detection statistic.

Figure 5:
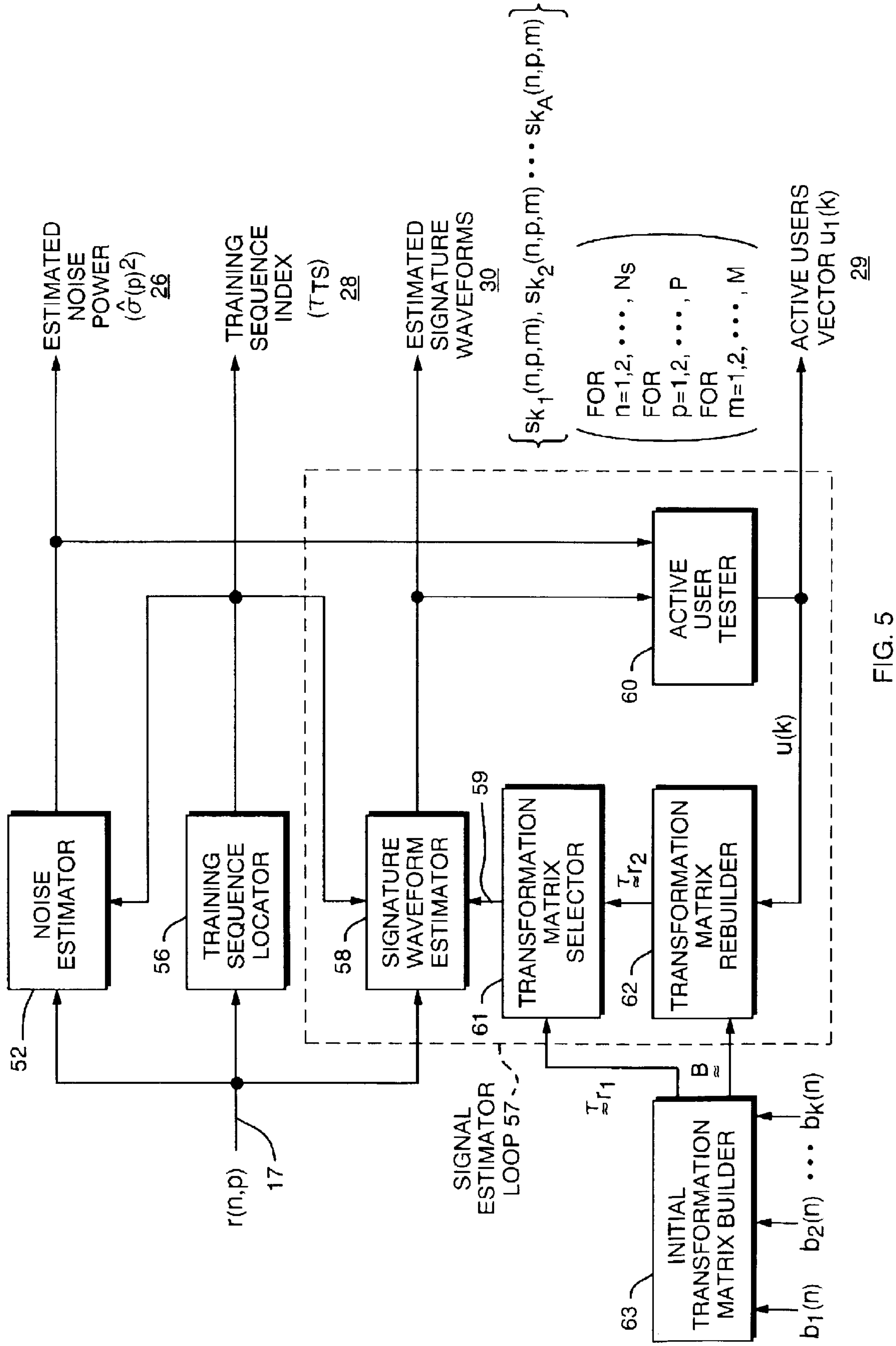
FIG. 5 is a block diagram of the Parameter Estimator.

Referring now to FIG. 5, a block diagram of the Parameter Estimator 20 is shown comprising software components which include a Training Sequence Locator 56 that is used to estimate the location index, $\tau_{TS}$, in each frame of received data, $f_m(n,p)$, of the composite received training sequence, β(n,p), a Noise Estimator 52 that is used to calculate an estimate of the average noise power $(\hat{\sigma}(p)^2)$ in the received signal r(n,p) for each diversity port, p, and a Signature Waveform Estimator 58 that is used to estimate the characteristic signature waveforms, $\hat{s}_k(n, p, m)$, unique to each user K, and each diversity port p, for each frame m, in the snapshot. The output of the Signature Waveform Estimator 58 is fed to an Active Users Tester 60 which detects which users signals are present in the given snapshot, and provides an output to a Transformation Matrix Rebuilder 62 which rebuilds the Transformation Matrix $(\underline{\underline{T}}_{r2})$ that is used in the Signature Waveform Estimator 58. This matrix is rebuilt by using only the training sequences, $b_k(n)$, of the active users as calculated by the Active Users Tester 60. The output of the Transformation Matrix Rebuilder 62 is fed to a Transformation Matrix Selector 61 which selects the output $\underline{\underline{T}}_{r1}$ from an Initial Transformation Matrix Builder 63 or the output $\underline{\underline{T}}_{r2}$ from the Transformation Matrix Rebuilder to send to the Signature Waveform Estimator 58. The Transformation Matrix Selector 61 always selects $\underline{\underline{T}}_{r1}$ for the initial estimate of the signature waveforms in the given snapshot, and always selects $\underline{\underline{T}}_{r2}$ for all subsequent recalculations of the signature estimates for the same snapshot of data. This allows the Signature Waveform Estimator 58 to calculate a better estimate of the characteristic signature waveforms, $\hat{s}_{k\alpha}(n, p, m)$, for only the active users as determined by the Active User Tester 60. This process of performing the Signature Waveform Estimator 58, performing the Active User Tester 60, and running the Transformation Matrix Rebuilder 62 is know as the Signature Estimation Loop 57 and is shown in FIG. 5. The Signature Estimation Loop 57 can be repeated until the output of the Active User Tester 60 calculated on the previous iteration equals the output of the Active User Tester 60 on the current iteration. It is also possible to set the maximum number of Signature Estimators Loops 57 in the Parameter Estimation 20 component. It is important to note that with each iteration through this Loop 57, the number of signature waveforms at the output of the Signature Waveform Estimator 58 is equal to the number of active users calculated on the previous iteration. It is also important to note that on the first iteration, the number of signature estimates is equal to the total number of possible users, K. Once the final signature estimates of the active users are calculated, the resulting waveforms are passed as outputs of the Parameter Estimator 20 along with the user states vector, u(k) that reports which users are active in the current snapshot.

The Initial Transformation Matrix Builder 63 receives known training sequence data, $b_k(n)$, for each user, which is prestored in a Memory 19 of the Multiuser Detection Receiver 12. Each user's training sequence data is used to build the Initial Transformation Matrix, $\underline{\underline{T}}_{r_1}$, which is fed to the Transformation Matrix Selector 61.

The Noise Estimator 52 estimates the noise power in the incoming signal, r(n,p) for all p=1,2, . . . P, diversity ports and feeds the information to the Active User Tester 60 and the Multiuser Detector 18. This estimation is typically done once per snapshot wherein the snapshot is at least the number of samples in two frames, but need not be done as often if the noise power is changing slowly or not at all. It is also important to note that the accuracy of the Noise Estimator 52 improves as the number of composite training sequence estimates, $\hat{\beta}_m(n, p)$, increases. To increase the number of composite training sequence estimates, the number of frames, $f_m(n,p)$, in the received complex baseband signal, r(n,p), must increase, resulting in an increased snapshot size, or the Training Sequence Selector 56 must store the composite training sequence estimates, $\hat{\beta}_m(n, p)$, for multiple snapshots of received data and calculate the estimated noise power using the total number of stored composite training sequence estimates $\hat{\beta}_m(n, p)$ . The Training Sequence Locator 56 determines the position of the training sequence in each frame, $f_m(n,p)$ of the received snapshot vector, r(n,p) and feeds this information in the form of a sample index, $\tau_{TS}$, referred to as the Training Sequence Location Index 28, to the Multiuser Detector 18. In addition, the position of the training sequence in the received snapshot is fed to the Noise Estimator 52 and to the Signature Waveform Estimator 58 where it is used to determine which section of each frame, $f_m(n,p)$, in r(n,p) to process in order to determine the average noise power estimate, $\hat{\sigma}(p)^2$ and signature estimates $\hat{s}_k(n, p, m)$, respectively. The Signature Waveform Estimator 58 estimates the signature waveforms $\hat{s}_k(n, p, m)$ in each frame, m, of each K individual co-channel interfering signal in the composite received input signal, r(n,p), for each diversity port p, and outputs this information to the Active User Tester 60 and Multiuser Detector 18.

Referring to FIG. 6, FIG. 6 shows a flow chart of the Training Sequence Locator 56 component for locating the training sequence in the received complex baseband signal, r(n,p), received from each diversity port, (p=1,2 . . . ,P), and it includes processing a minimum of two frames of received data. Because the number of samples in a transmitted frame of data (F) is known to the receiver, each received frame, $f_m(n,p)$, in r(n,p) repeats at the same time rate as a transmitted frame of data. Therefore, the location of the composite training sequence, β(n,p), will be the same for each frame, $f_m(n,p)$, of received data, but because the transmitted and received frames of data are not initially synchronized, the beginning of a transmitted frame of data may not start at the beginning of a frame, $f_m(n,p)$, of received data. This means that the location of the training sequence in each frame of received data also may not start at the beginning of each frame.

The Training Sequence Locator 56 finds the location of the training sequence in each frame of received data. To do this a sliding search window vector, $\underline{l}_m(\tau,p)$, that is L samples long (the same length as the received composite training sequence) is applied simultaneously through each frame of received data, and the correlation between each combination of windowed frames is computed and then averaged in a Detection Statistic Calculator 90. The result is a detection statistic, $d_p(\tau)$, which is exactly the length of a frame of received data (F samples long). Because the payload data is uncorrelated from frame to frame, the detection statistic will have a very low value when the sliding search windows are over the payload data in each frame. On the other hand, the composite training sequence, β(n,p), is highly correlated from frame to frame; therefore, the detection statistic will be very high when the sliding search windows are over the composite training sequence in each frame. Thus, the location $\tau_p$, of the peak in the detection statistic, $d_p(\tau)$, will be the location of the training sequence in each frame sequence, $f_m(n,p)$.

Still referring to FIG. 6, the inputs to the Training Sequence Locator 56 component are complex baseband received signals, r(n,p), from each diversity port, (p=1,2, . . . P). An estimate of the training sequence location index, $\tau_p$, is calculated separately for each diversity port signal, r(n,p) by the Detection Statistic Calculator 90. The first step in estimating the training sequence location index, $\tau_p$, is to provide the received signal, r(n,p), to the Detection Statistic Calculator 90, for calculating the detection statistic, $d_p(\tau)$, using that received signal. As previously stated, each element of this detection statistic is generated by calculating the correlation coefficients, $\rho_{ij}(\tau,p)$, for each combination of sliding search windows for a given training sequence sample index, τ. Once each combination of correlation coefficients are calculated, they are averaged and output as the value of the detection statistic, $d_p(\tau)$, for the specified value of τ. The step by step calculations needed to perform this process are as follows:

Step 1. Define the sliding search window, $\underline{l}_m(\tau,p)$ for each frame of received data in the given signal, r(n,p), for the given search window sample index, τ.

$$\underline{l}_m(\tau,p)=\begin{bmatrix} r(\tau+(m-1)\cdot F,\ p) \\ r(\tau+(m-1)\cdot F+1,\ p) \\ \vdots \\ r(\tau+(m-1)\cdot F+(L-1),\ p)\end{bmatrix},\ \forall\ m=1,2,\ldots,M \quad (3)$$

Step 2. Calculate the energy, $e_m(\tau,p)$, in each sliding search window, $\underline{l}_m(\tau,p)$:

$$e_m(\tau,p)=\underline{l}_m(\tau,p)^H\cdot\underline{l}_m(\tau,p),\ \forall m=1,2,\ldots,M \quad (4)$$

Step 3. Calculate the correlation coefficient, $\rho_{ij}(\tau,p)$, for each combination of sliding search windows:

$$\rho_{i,j}(\tau,p)=\frac{\left\|\underline{l}_i(\tau,p)^H\cdot\underline{l}_j(\tau,p)\right\|}{\sqrt{e_i(\tau,p)\cdot e_j(\tau,p)}},\ \forall\ (i,j)=\begin{Bmatrix}(1,2),(1,3),\ldots(1,M),\\(2,3),(2,4),\ldots(2,M),\\\ldots,(M-1,M)\end{Bmatrix} \quad (5)$$

Step 4. Calculate the detection statistic, $d_p(\tau)$, for the given search window sample index, τ, for diversity port, p, by averaging the corresponding correlation coefficients:

$$d_p(\tau)=\frac{\sum_{i=1}^{M-1}\sum_{j=i+1}^{M}\rho_{i,j}(\tau,p)}{\sum_{i=1}^{M-1} i} \quad (6)$$

This process (steps 1–4) is repeated for each search window sample index, {τ=1,2, . . . ,F} and for each diversity port {p=1,2, . . . P}.

Still referring to FIG. 6, once the detection statistic, $d_p(\tau)$, for each diversity ports received signal, r(n,p), is calculated, it is fed to a Training Index Finder 92, where the estimated location, $\tau_p$, of the training sequence for each diversity port signal is calculated by finding the sliding search window index, τ, that maximizes the detection statistic. The Training Index Finder 92, calculates the following equation for each detection statistic, $d_p(\tau)$:

$$\tau_p=arg\left\{\max_{\tau\in\{1,2,\ldots F\}}(d_p(\tau))\right\},\ \forall\ p=1,2,\ldots,P \quad (7)$$

Next, a Confidence Metric Calculator 94, calculates a confidence metric from each detection statistic. This is done by calculating the peak to rms value of each detection statistic. This process is implemented by performing the following calculation for each detection statistic, $d_p(\tau)$.

$$c_p=\frac{\max(d_p(\tau))}{\mathrm{rms}(d_p(\tau))},\ \forall\ p=1,2,\ldots,P \quad (8)$$

As previously stated, this entire detection process is applied to the received signal, r(n,p), of each diversity port, p, separately. Once the training sequence location, $\tau_p$, has been estimated and the confidence metric, $c_p$, has been computed for each signal, a decision test is applied to determine which estimate to use. Comparator 96 performs this decision test by comparing the values of each confidence metric and setting the output training sequence location, $\tau_{TS}$, equal to the estimated training sequence, $\tau_p$, that has the highest confidence metric, $c_p$. This process is described mathematically in the following equation:

$$\tau_{TS} = \tau_p \ni p = \arg\left\{\max_{p\in\{1,2,\ldots,P\}}(c_p)\right\} \quad (9)$$

Figure 7:
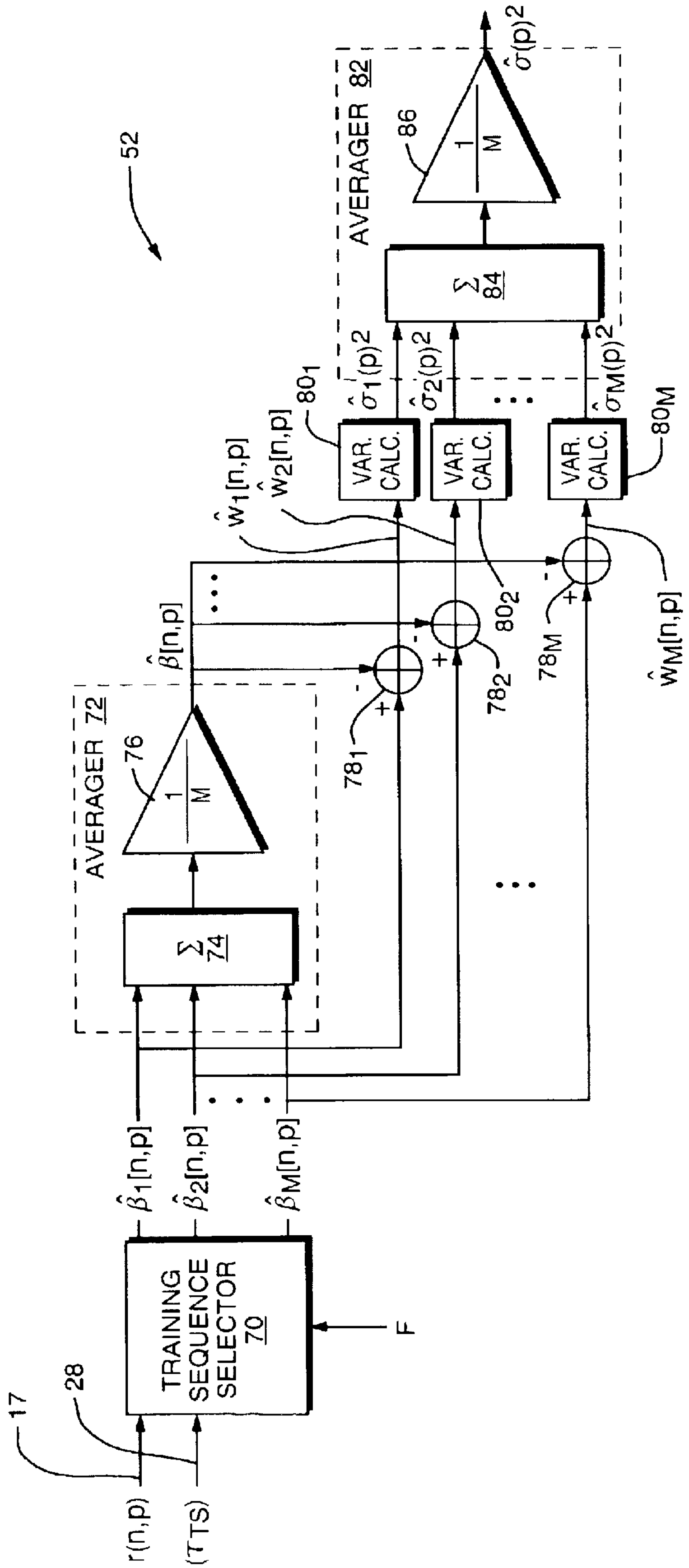
FIG. 7 is a block diagram of the Noise Estimator component.

Referring to FIG. 5 and FIG. 7, FIG. 7 is a block diagram of the Noise Estimator 52 of the Parameter Estimator 20 which calculates an accurate estimate of the average noise power in the received signal, r(n,p), from each diversity port p. In this system, as in most receivers, the dominant noise source is the thermal noise generated by the first stage of low noise amplifiers (LNAs) in the Signal Sampler 14. This noise can be accurately modeled as complex zero mean additive white gaussian noise (AWGN). Because each diversity port p contains its own stage of LNAs, the noise power in the received signal, r(n,p), may be slightly different from port to port. Therefore, it is important to obtain a separate estimate of the noise power for each diversity port p. Because the noise is additive, the section in each frame of received data, r(n,p), which contains the composite training sequence, β(n,p), can be modeled as the composite training sequence plus additive white noise, $w_m$(n,p). This noise is also considered to be statistically independent of the received data. The Training Sequence Locator 56 component (described above) determines the location index in each frame $f_m$(n,p) of received data that contains the composite training sequences. This allows the Noise Estimator 52 to extract the section of each frame, which contains an estimate of the received composite training sequence $\hat{\beta}_m$(n, p).

Referring to FIG. 7, Training Sequence Selector 70 receives the complex baseband signal r(n,p) for diversity port p into a routine that outputs the sections of that signal corresponding to the received training sequence for each frame of received data. Training Sequence Selector 70 also receives the training sequence index, $\tau_{TS}$ 28 and the number of frames of data, M, captured in the received signal r(n,p) for use in selecting such outputs. M is calculated based on the size of the received signal r(n,p) and the known number of samples per frame, F. The Training Sequence Selector 70 outputs, $\hat{\beta}_m$(n, p) for (m=1,2, . . . M), which are fed to an Averager 72 that calculates the average, value of each of the vectors, $\hat{\beta}_m$(n, p) in order to get a good representation of the composite training sequences $\hat{\beta}$(n, p). The Averager 72 comprises a summing routine 74 and a 1/M routine 76. The next step is to subtract the estimated signal, $\hat{\beta}$(n, p), from each vector, $\hat{\beta}_m$(n, p), in summers $\mathbf{78}_1$, $\mathbf{78}_2$, . . . $\mathbf{78}_M$ to obtain an estimated noise signal, $\hat{w}_m$(n, p), contained in each vector, $\hat{\beta}_m$(n, p). Then each noise signal, $\hat{w}_1$(n, p),$\hat{w}_2$(n, p), . . . $\hat{w}_M$(n, p), is fed to a variance calculator $\mathbf{80}_1$, $\mathbf{80}_2$ . . . $\mathbf{80}_M$ where the variance of each noise signal is calculated to obtain an estimate of the average noise power, $\hat{\sigma}_m(p)^2$, in each frame, M. The average noise power, $\hat{\sigma}_m(p)^2$, in each frame is fed to an Averager 82 which determines an estimate of the average noise power, $\hat{\sigma}(p)^2$, in the received signal r(n,p) for diversity port p. If there is more than one diversity port, the above process is repeated to obtain a noise power estimate for the received signal, r(n,p) received by each diversity port (p=1,2, . . . ,P).

Still referring to FIG. 7, an accurate estimate of the received composite training sequence, $\hat{\beta}$(n, p), is used to obtain a noise power estimate for the received signal, r(n,p), from each diversity port, p, separately. The first step in estimating the noise power in the received signal, r(n,p), for diversity port, p, is for the Training Sequence Selector 70 to extract the estimated composite training sequences, $\hat{\beta}_m$(n, p), in each frame of received data based on the training sequence location index ($\tau_{TS}$), the number of samples per frame (F), the number of samples in each received training sequence to process ($N_w$) and the offset into each received training sequence ($\delta_w$) to use. It is important to note that both $N_w$ and $\delta_w$ are parameters that are stored in the memory of the Training Sequence Selector 70, and therefore can be modified to select any section of the received composite training sequences. These values would typically be set so that the central portion of each composite received training sequence is extracted from the received signal, r(n,p). The Training Sequence Selector is described mathematically as follows:

$$\hat{\beta}_m(n, p) = r((n-1) + (m-1)\cdot F + \tau_{TS} + \delta_w, p), \quad \begin{matrix}\forall\ n = 1, 2, \ldots, N_w \\ \forall\ m = 1, 2, \ldots, M\end{matrix} \quad (10)$$

Once the estimated received training sequences, $\hat{\beta}_m$(n, p), for each frame, m, of received data have been extracted from the received signal, r(n,p), they are all averaged with each other by the Averager 72 in order to minimize the affects of the noise vector, $w_m$(n,p), added to each estimate of the received training sequence. This produces a more accurate estimate of the actual received training sequence, $\hat{\beta}$(n, p). This process is expressed mathematically as follows:

$$\hat{\beta}(n, p) = \frac{1}{M}\sum_{m=1}^{M}\hat{\beta}_m(n, p),\ \forall\ n = 1, 2, \ldots, N_w \quad (11)$$

Once this is done, this estimated received training sequence, $\hat{\beta}$(n, p), is subtracted from each vector, $\hat{\beta}_m$(n, p), in order to obtain an estimate of the noise signal, $\hat{w}_m$(n, p) contained in each.

Next, the variance of each noise signal is calculated by Variance Calculators $\mathbf{80}_1$ to $\mathbf{80}_M$ to obtain an estimate of the average noise power, $\hat{\sigma}_m(p)^2$, in each frame. This calculation is expressed as follows:

$$\hat{\sigma}_m(p)^2 = \frac{1}{N_w}\sum_{n=1}^{N_w}\|\hat{w}_m(n, p)\|^2,\ \forall\ m = 1, 2, \ldots, M \quad (12)$$

Each of these noise power estimates, $\hat{\sigma}_m(p)^2$, are then averaged in Averager 82 to obtain an estimate of the average noise power, $\hat{\sigma}(p)^2$ in the received signal, r(n,p). This averaging is performed mathematically as follows:

$$\hat{\sigma}(p)^2 = \frac{1}{M}\sum_{m=1}^{M}\hat{\sigma}_m(p)^2 \quad (13)$$

This entire process is repeated for each diversity port, p, in order to obtain a noise power estimate for each received signal, r(n,p).

Figure 8:
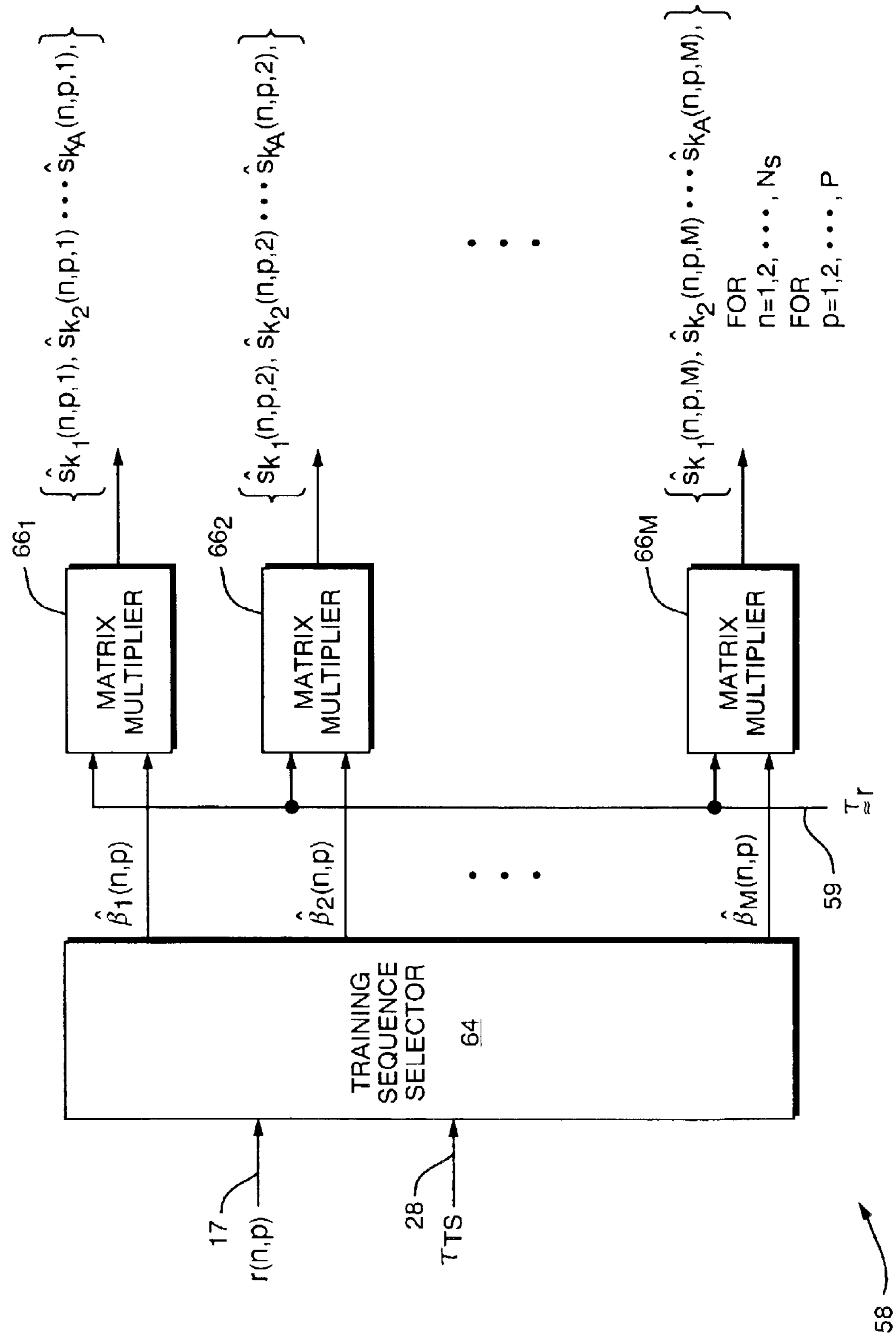
FIG. 8 is a flow chart of the Signature Waveform Estimator component.

Referring to FIG. 8, a flow chart of the Signature Waveform Estimator 58 component is shown comprising a Training Sequence Selector 64 which provides the received training sequence, $\hat{\beta}_m$(n, p) , for each frame m of received data, to Matrix Multiplier $\mathbf{66}_m$. The Signature Waveform Estimator 58 estimates the characteristic signature waveforms $\hat{s}_k$(n, p, m) that transform each user's transmission signal as it propagates from transmitter to receiver, for each diversity port, p, and each frame, m, of received data. This transformation is expressed mathematically as follows:

$$r(n,p)=\sum_{k=1}^{K} d_k(n) * s_k(nT_n,p)+w(n,p) \quad (14)$$

This equation shows that the complex baseband signal received from diversity port (p) is the sum of each users transmission signal, $d_k(n)$, convolved (indicated by the asterisk) with a corresponding characteristic signature waveform, $s_k(nT_n,p)$, sampled at $T_n$ seconds per sample, that is unique to user, k, and diversity port, p, plus additive white noise, w(n,p). This expression can be rewritten in matrix form as follows:

$$\therefore \overset{(N\times 1)}{\underline{r}(p)} = \overset{(N\times KN_s)}{\underline{\underline{D}}} \cdot \overset{(KN_s\times 1)}{\underline{s}(p)} + \overset{(N\times 1)}{\underline{w}(p)} \quad (15)$$

where:

$$\overset{(N\times N_s)}{\underline{\underline{D}}_k} = \begin{bmatrix} d_k(1) & 0 & \cdots & 0 \\ d_k(2) & d_k(1) & \iddots & \vdots \\ \vdots & d_k(2) & \iddots & 0 \\ \vdots & \vdots & \iddots & d_k(1) \\ d_k(N_d) & \vdots & \iddots & d_k(2) \\ 0 & d_k(N_d) & \iddots & \vdots \\ \vdots & \iddots & \iddots & \vdots \\ 0 & \cdots & 0 & d_k(N_d) \end{bmatrix}; \overset{(N_s\times 1)}{\underline{s}_k(p)} = \begin{bmatrix} s_k(1,p) \\ s_k(2,p) \\ \vdots \\ s_k(N_s,p) \end{bmatrix} \quad (16)$$

$$\overset{(N\times KN_s)}{\underline{\underline{D}}} = [\underline{D}_1,\ \underline{D}_2,\ \cdots\ \underline{D}_K];\ \overset{(KN_s\times 1)}{\underline{s}(p)} = [s_1(p)^T\ \ s_2(p)^T\ \cdots\ s_K(p)^T]^T \quad (17)$$

$$\overset{(N\times 1)}{\underline{r}(p)} = [r(1,p)\ \ r(2,p)\ \cdots\ r(N,p)]^T;\quad \overset{(N\times 1)}{\underline{w}(p)} = [w(1,p)\ \ w(2,p)\ \cdots\ w(N,p)]^T \quad (18)$$

For a given diversity port, p, the approach used to estimate these signature responses is to compare the section of the received signal that contains the composite training sequence, $\beta(n,p)$, with the actual known training sequences, $b_k(n)$, transmitted by each user, k=1,2, . . . K. This can be accomplished because the transmitted training sequences, $b_k(n)$, from each user are known by the Receiver 12 and because an estimate of the received composite training sequence, $\beta(n,p)$ can be extracted from the received signal, r(n,p), using the Training Sequence Locator 56. In this case $$d_k(n)=b_k(n),\ \underline{\underline{D}}=\underline{\underline{B}},\ r(n,p)=\beta(n,p),\text{ and } \underline{r}(p)=\underline{\beta}(p) \quad (19)$$

The maximum likelihood estimate of the characteristic signature waveforms $\hat{s}_k(n,p)$, for each user, k, and each diversity port, p, is the one that collectively minimize the square error between the received composite training sequence, $\beta(n,p)$, and the sum of each users training sequence convolved with its corresponding signature waveform $$\left(\sum_{k=1}^{K} b_k(n) * \hat{s}_k(n,p)\right).$$

This maximum likelihood estimate is expressed mathematically in matrix form as follows:

$$\underline{s}_{ML}(p)=\arg\min_{s\in\Omega}\left\{\left\|\underline{\beta}(p)-\underline{\underline{B}}\cdot\underline{s}\right\|^2\right\} \quad (20)$$

Where: Ω=The set of all possible combonations of $\underline{s}$

Using the maximum likelihood approach, the signature estimates can be solved for by using a zero forcing criteria. This is done by setting the expression inside the minimization equal to zero as follows:

$$\|\underline{\beta}(p)-\underline{\underline{B}}\cdot\underline{s}_{ML}(p)\|^2=0 \quad (21)$$

Once this is done it is clear that the characteristic signature waveform vector can be calculated by solving the above set of linear equations for $\underline{s}_{ML}(p)$ as follows:

$$\underline{s}_{ML}(p)=((\underline{\underline{B}}^H\underline{\underline{B}})^{-1}\underline{\underline{B}}^H)\underline{\beta}(p) \quad (22)$$

Based on the solution of the maximum likelihood equation above, the first step is for Training Sequence Selector 64 in the Signature Waveform Estimator 58 to extract the portion of the received signal, r(n,p), for each frame, m, that contains the received composite training sequence, $\hat{\beta}_m(n,p)$, in that frame. This is done in the Training Sequence Selector (step 64) and is based on the location of the training sequence, $\tau_{TS}$, the number of samples per frame, F, the number of samples of the received training sequence to select, $N_\beta$, and the offset into each received training sequence, $\delta_\beta$, to use. It is important to note that $N_\beta$ is equal to $(N_s+N_b-1)$, where $N_s$ is the number of samples to use for each signature estimate, and $N_b$ is the number of samples to in the known training sequences. It is also important to note that $N_s$ and $\delta_\beta$ are parameters that are stored in the memory of this Training Sequence Selector 64 and therefore can be modified to select any section of the received composite training sequences in each frame. These values would typically be set so that the entire composite received training sequence is extracted from the received signal, r(n,p). This Training Sequence Selector step 64 is described mathematically as follows:

$$\hat{\beta}_m(n,p)=r((n-1)+(m-1)\cdot F+\tau_{TS}+\delta_\beta,p)),\quad \begin{array}{l}\forall\ n=1,2,\ldots,N_\beta\\ \forall\ m=1,2,\ldots,M\end{array} \quad (23)$$

The next step $66_1$ to $66_M$ in estimating the signature waveforms is to multiply the transformation matrix $\underline{\underline{T}}_r$, received from the Transformation Matrix Selector 61, with the section of the received complex baseband signal that contains the composite received training sequence estimate, $\hat{\beta}_m(n, p)$, for each frame, m, where m=1,2, . . . M, using the Matrix Multiplier step 66$_1$ to 66$_M$ as follows:

$$\underline{\hat{\beta}}_m(p)=[\hat{\beta}_m(1,p)\hat{\beta}_m(2,p)\ \ldots\ \hat{\beta}_m(N_\beta,p)]^T,\ \forall m=1,2,\ \ldots\ M \tag{24}$$

$$\hat{\underline{s}}(p,m)=\underline{\underline{T}}_r\cdot\underline{\hat{\beta}}_m(p),\ \forall m=1,2\ \ldots\ M \tag{25}$$

where:

$$\hat{s}(p,m)=\begin{bmatrix}\hat{s}_{k_1}(p,m)\\ \hat{s}_{k_2}(p,m)\\ \vdots\\ \hat{s}_{k_A}(p,m)\end{bmatrix};\quad \hat{s}_{k_2}(p,m)=\begin{bmatrix}\hat{s}_{k_a}(1,p,m)\\ \hat{s}_{k_a}(2,p,m)\\ \vdots\\ \hat{s}_{k_a}(N_s,p,m)\end{bmatrix} \tag{26}$$

(Note: A=total number of active users and $k_a$=index of the $a^{th}$ active user. Therefore, for the first iteration through the signature estimation loop, $k_a$=k and A=K for k−1,2, . . . K because for the first iteration it is assumed that all K users are active.)

On the initial calculation of the signature waveform estimates the transformation matrix, $\underline{\underline{T}}_r$, is passed into the Signature Waveform Estimator 58 from the Initial Transformation Matrix Builder by way of the Transformation Matrix Selector 61 routine. On all subsequent estimates of the signature waveforms for the given complex baseband received signal, r(n,p), the Transformation matrix $\underline{\underline{T}}_r$ is passed to the Signature Waveform Estimator 58 from the Transformation matrix Rebuilder 62 by way of the Transformation Matrix Selector routine 61. This is done so that only signature estimates of the Active users ($k_a$) are calculated. It is important to note that the dimensions of the Transformation Matrix $\underline{\underline{T}}_r$ are a function of the number of samples ($N_s$) in each characteristic signature estimate, $\hat{s}_{k_a}$(n, p, m), the estimated number of currently active users (A) and the number of samples ($N_\beta$) in each received composite training sequence estimate ($\hat{\beta}_m$(n, p))

Figure 9:
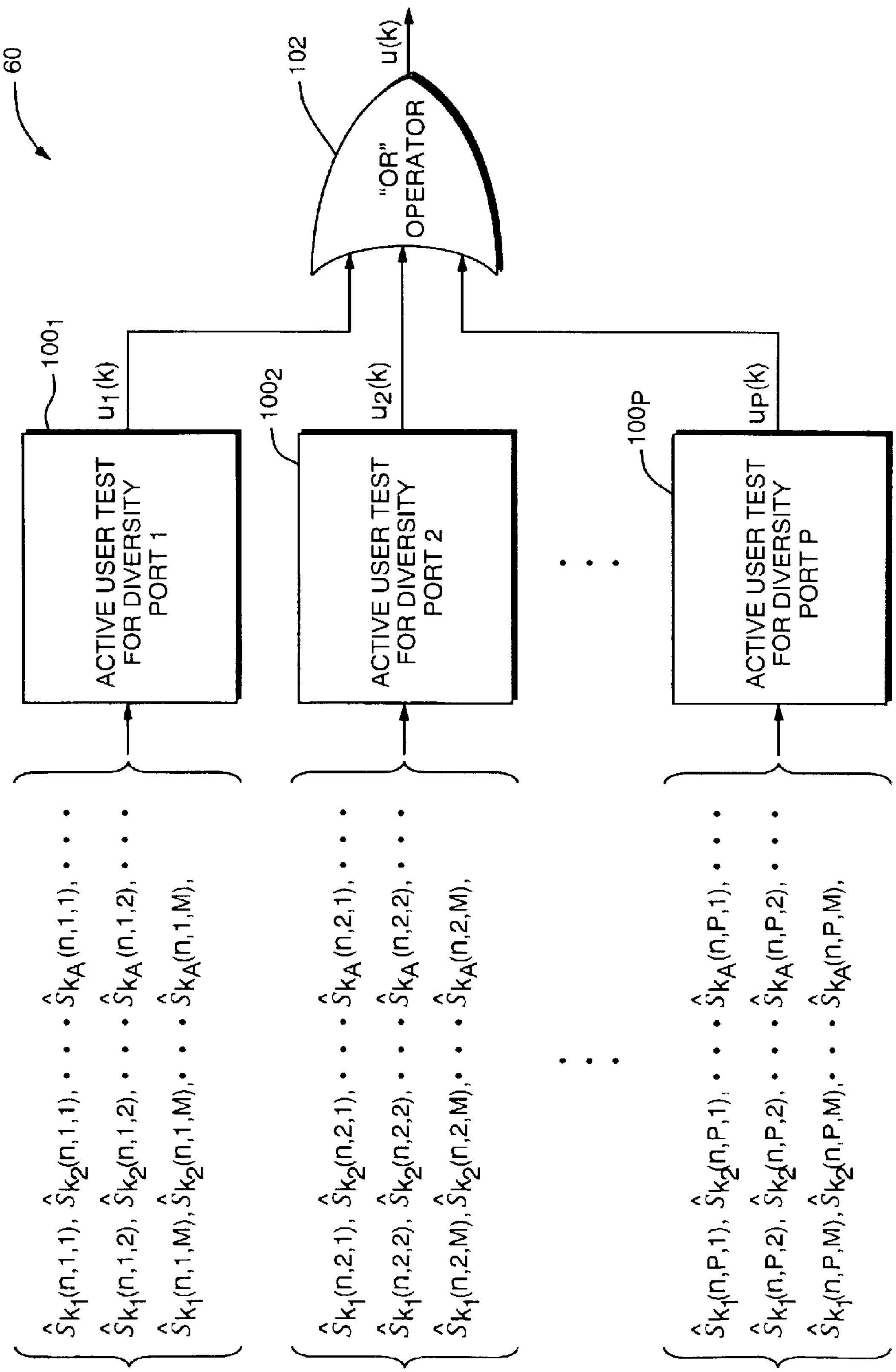
FIG. 9 is a flow chart for an Active User Tester component.

Referring to FIG. 9, a flow chart is shown for the Active User Tester 60 component. The purpose of the active user test is to determine which users are transmitting information in each snapshot of received data, r(n,p). This test is performed once for each iteration of the signature estimation loop. This is done by calculating the average received power in users signal based on the signature estimates, $\hat{s}_{k_a}$(n, p, m), for each user, $k_a$, in each frame of received data, m, across each diversity port, p. These power estimates, $\hat{P}_{k_a}$(p, m), are averaged across each frame, m, and the result, $\hat{P}_{k_a}$(p), is compared to a predefined threshold, $r_{th}$, that is set relative to the estimated noise floor, $\hat{\sigma}(p)^2$.

To perform the Active User Test, the signature estimates, $\hat{s}_{k_a}$(n, p, m), are processed for each diversity port, p, separately by a step 100*p* referred to as the Active User Test For Diversity Port "p". The output of this step is a sequence, $u_p$(k), of ones and zeros that is (K) elements long. If $u_p$(k)=0, then user k is estimated to be "inactive" and if $u_p$(k)=1, then user k is estimated to be "actively transmitting" based on the signature estimates for diversity port p. This output sequence, $u_p$(k), is referred to as the active user test results sequence for diversity port p. Once this test result sequence is calculated for each diversity port, they are passed to a logical "OR" Operator 102. This logical "OR" function sets the combined active user test result sequence, u(k), equal to 1 if any of the P $u_p$(k) sequences are equal to 1 for each value of k, where k={1,2, . . . K}. Therefore, the combined active user test result sequence u(k)=1 if any of the $u_p$(k) sequences equal 1 and u(k)=0 otherwise, for each user k=1,2, . . . K.

Figure 10:
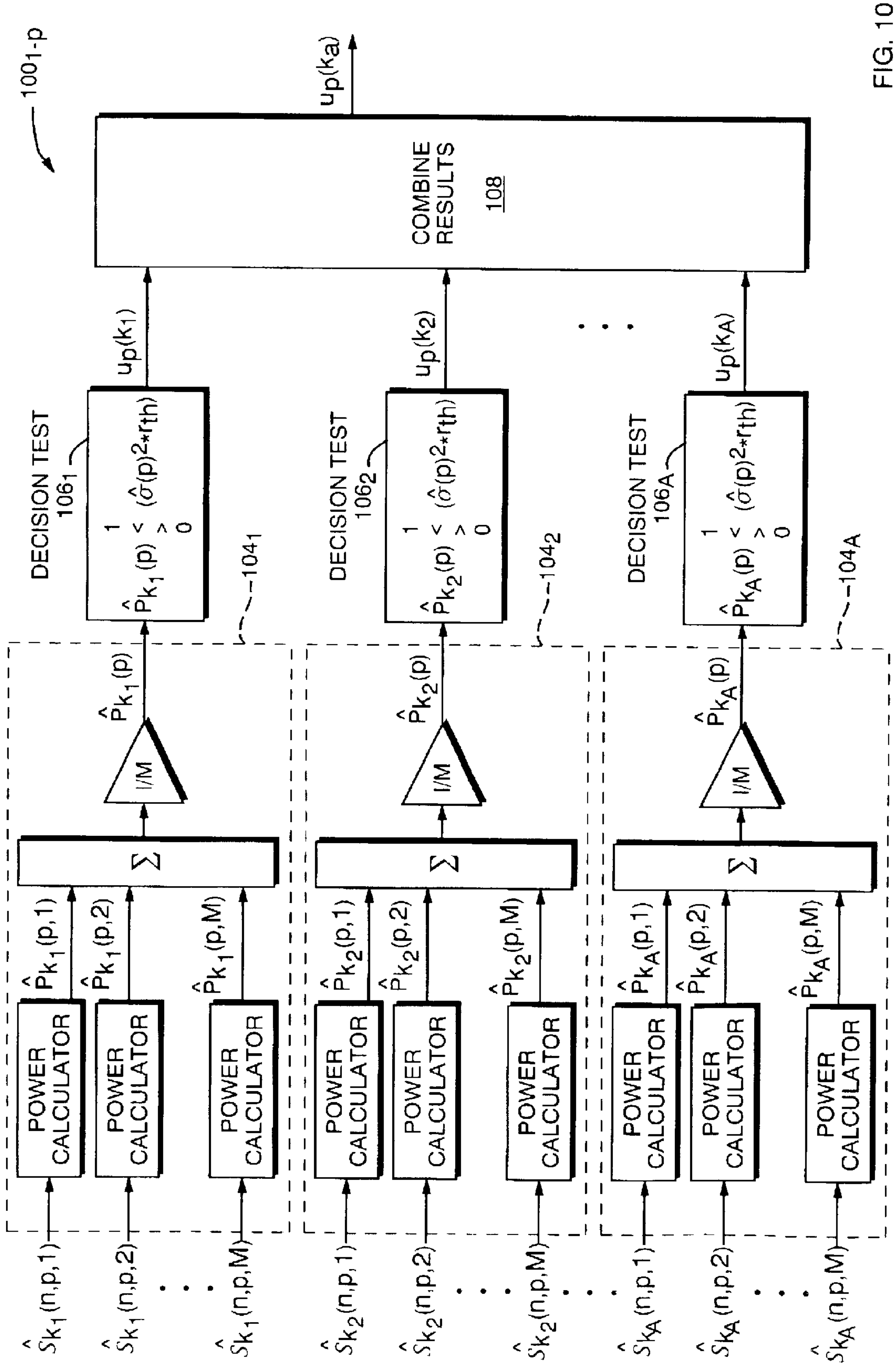
FIG. 10 is a flow chart for an Active User Test For Diversity Port "p".

Referring to FIG. 10, a flow chart is shown for the Active User Test For Diversity Port "p" 100$_p$ of FIG. 9. For a given diversity port, p, the active user test result, $u_p(k_a)$, is calculated for the given user $k_a$, which was calculated to be active in the previous iteration of the signature estimation loop, by performing the following process:

The first step 104$_1$ to 104$_p$ is to estimate the average received signal power for each user ($k_a$) using the estimated characteristic signature response, $\hat{s}_{k_a}$(n, p, m), for each frame, m, and each user, $k_a$, where $k_a=k_1, k_2, \ldots k_A$ as shown in FIG. 10, and it is calculated as follows:

$$\hat{P}_{k_a}(p,m)=\frac{1}{F_{sym}}\sum_{n=1}^{N_s}\left\|\hat{S}_{k_a}(n,p,m)\right\|^2,\quad \begin{matrix}\forall\ k_a=k_1,k_2,\ldots,k_A\\ \forall\ m=1,2,\ldots,M\end{matrix} \tag{27}$$

Where: $F_{sym}$=# of samples per symbol

Once the signal powers, $\hat{P}_{k_a}$(p, m), are estimated for each user, $k_a$, the results from each frame are averaged as follows:

$$\hat{P}_{k_a}(p)=\frac{1}{M}\sum_{m=1}^{M}\hat{P}_{k_a}(p,m),\ \forall\ k_a=k_1,k_2,\ \ldots\ ,k_A \tag{28}$$

In the next step 106$_1$ to 106*p*, these estimated signature powers for each user ($k_a=k_1, k_2, \ldots, k_A$) are compared to a detection threshold, $r_{th}$, relative to the estimated noise floor, $\hat{\sigma}(p)^2$. If the estimated signature power, $\hat{P}_{k_a}$(p), for user $k_a$ is greater than or equal to the product of the relative threshold, $r_{th}$, with the estimated noise floor, $\hat{\sigma}(p)^2$, then the active user test result, $u_p(k_a)$, for that user $k_a$ is set to 1. Otherwise, it is set to 0. This test is expressed mathematically as follows:

$$u_p(k_a)=\begin{cases}1 & \hat{P}_{k_a}(p)\geq(\hat{\sigma}(p)^2\cdot r_{th})\\ 0 & \text{otherwise}\end{cases},\ \forall\ k_a=k_1,k_2,\ \ldots\ ,k_A \tag{29}$$

In Combine Results step 108, all of the results for $u_p(k_a)$ are then combined with the original user states vector, $u_p$(k) as follows:

$$u_p(k)=\begin{cases}u_p(k_a) & k=k_a\\ 0 & \text{otherwise}\end{cases},\quad \forall\ k=1,2,\ \ldots\ ,K \tag{30}$$

Referring again to FIG. 5, the Transformation Matrix Rebuilder 62 uses the results of the Active User Tester 60 to rebuild the transformation matrix, $\underline{\underline{T}}_r$, which is used by the Signature Waveform Estimator 58 to estimate the signature responses for each user, k, diversity port, p, and frame, m. This transformation matrix is rebuilt by removing the sub matrices, $\underline{\underline{B}}_k$, in the training sequence matrix, $\underline{\underline{B}}$, that correspond to the inactive users. This is done to create an updated transformation matrix, $\underline{\underline{T}}_{r2}$, that is used to only estimate the signature responses of the active users, $k_a$. This process is applied mathematically as follows:

$$\underline{\underline{\tilde{B}}}=\lfloor\underline{\underline{\tilde{B}}}_{k_1},\ \underline{\underline{\tilde{B}}}_{k_2},\ \ldots\ \underline{\underline{\tilde{B}}}_{k_A}\rfloor \tag{31}$$

$$\therefore\underline{\underline{T}}_{r2}=(\underline{\underline{\tilde{B}}}^H\underline{\underline{\tilde{B}}})^{-1}\underline{\underline{\tilde{B}}}^H \tag{32}$$

Where $k_a$ can be defined using the following algorithm:

```
a = 1;
for k = 1:K
    if(u(k) = 1)
        k_a = k
        a = a + 1
    end
end
```

The updated transformation matrix, $\underline{\underline{T}}_{r2}$, is passed to the Signature Waveform Estimator 58 by way of the Transformation Matrix Selector 61. Inside the Signature Waveform Estimator 58 the updated transformation matrix, $\underline{\underline{T}}_{r2}$, is reapplied to each estimated received training sequence, $\hat{\beta}_m(n, p)$, for each diversity port, p, and for each frame, m, in order to calculate more accurate signature waveform estimates for only the active users.

Still referring to FIG. 5, the Initial Transformation Matrix Builder calculates the initial transformation matrix $\underline{\underline{T}}_{r1}$, based on the known training sequences ($b_k(n)$), which are $N_b$ samples long, for each possible user (k=1,2, . . . K). This transformation matrix is calculated as follows:

First, the known training sequence convolution matrix ($\underline{\underline{B}}$) is determined:

$$\underset{((N_b+N_s-1)xN_s)}{\underline{\underline{B}}_k} = \begin{bmatrix} b_k(1) & 0 & \cdots & 0 \\ b_k(2) & b_k(1) & \ddots & \vdots \\ \vdots & b_k(2) & \ddots & 0 \\ \vdots & \vdots & \ddots & b_k(1) \\ b_k(N_b) & \vdots & \ddots & b_k(2) \\ 0 & b_k(N_b) & \ddots & \vdots \\ \vdots & \ddots & \ddots & \vdots \\ 0 & \cdots & 0 & b_k(N_b) \end{bmatrix} \tag{33}$$

$$\underset{((N_b+N_s-1)xKN_s)}{\underline{\underline{B}}} = \left[\underline{\underline{B}}_1, \underline{\underline{B}}_2, \ldots \underline{\underline{B}}_k\right] \tag{34}$$

Second, the transformation matrix ($\underline{\underline{T}}_{r1}$) is calculated as follows:

$$\underset{(KN_sx(N_b+N_s-1))}{\underline{\underline{T}}_{r1}} = \left(\underline{\underline{B}}^H \underline{\underline{B}}\right)^{-1} \underline{\underline{B}}^H \tag{35}$$

The Initial Transformation Matrix ($\underline{\underline{T}}_{r1}$), is passed to the Signature Waveform Estimator by way of the Transformation Matrix Selector 61, and is used to calculate the initial signature waveform estimates, $\hat{s}_k(n, p, m)$, for each possible user, k, across each diversity port, p, and each frame, m, of received data. Also, the known training sequence convolution matrix is passed to the Transformation Matrix Rebuilder 62 so that the sub matrices ($\underline{\underline{B}}_1$, $\underline{\underline{B}}_2$ . . . $\underline{\underline{B}}_k$) do not need to be regenerated for each iteration of the signature estimation loop.

The Transformation Matrix Selector 61 component is used to select which transformation matrix will be passed to the Signature Waveform Estimator 58. For a given snapshot of the complex baseband received signal, r(n,p), the initial signature waveform estimates, $\hat{s}_k(n, p, m)$, are calculated using the initial transformation matrix, $\underline{\underline{T}}_{r1}$. Therefore, in this case, the Transformation Matrix Selector passes $\underline{\underline{T}}_{r1}$ to the Signature Waveform Estimator 58 by setting its output, $\underline{\underline{T}}_r$, equal to $\underline{\underline{T}}_{r1}$. Once the Signature Waveform Estimator 58 estimates the signature waveforms for each user, the results are passed to the Active User Tester 60 to determine which users are currently active. These results are then passed to the Transformation Matrix Rebuilder 62 to rebuild the transformation matrix using only the known training sequence convolution matrices ($\underline{\underline{B}}_{k_a}$) for the active users. Therefore, after the initial signature waveform estimates have been calculated, the Transformation Matrix Selector 61 passes the rebuilt transformation matrix, $\underline{\underline{T}}_{r_2}$, to the Signature Waveform Estimator 58 by setting its output, $\underline{\underline{T}}_r$, equal to $\underline{\underline{T}}_{r_2}$.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

TABLE

| SYMBOL | DESCRIPTION |
|---|---|
| n | Time sample index |
| p | Diversity port index |
| P | Total number of diversity port |
| k | User index |
| K | Total number of possible users |
| $k_a$ | User index for the $a^{th}$ active user (this is updated with each iteration through the signature estimation loop) |
| A | Total number of active users calculated by the Active User Tester (this is updated with each iteration through the signature estimation loop) |
| m | Frame index |
| M | Total number of frames of received data |
| F | Total number of samples per frame |
| $N_s$ | Total number of samples in the estimated signature response sequences |
| $N_b$ | Total number of samples in the known training sequences |
| $N_\beta$ | Total number of samples in the composite received training sequences ($N_b+N_S-1$) |
| $N_w$ | Number of samples in the composite received training sequences used to estimate the average noise power of each received signal |
| $F_{sym}$ | Number of samples per symbol in the complex baseband received signal r(n, p) |
| $\delta_\beta$ | Offset in samples from the start of the composite received training sequences used to estimate the signature waveforms |
| $\delta_w$ | Offset in samples from the start of the composite received training sequences used to estimate the average noise power of each received signal |
| L | Total number of samples in the training sequence search window |
| $b_k(n)$ | Known training sequence for user (k) |
| $\underline{\underline{B}}_k$ | Known training sequence convolution matrix for user (k) |
| $\underline{\underline{B}}$ | Combined known training sequence convolution matrix for all K users |
| $\underline{\underline{B}}_{k_a}$ | Known training sequence convolution matrix for active user ($k_a$) |
| $\tilde{\underline{\underline{B}}}$ | Rebuilt combined known training sequence convolution matrix for all A active users |
| $d_k(n)$ | Transmitted data sequence from user k |
| $\hat{d}_{ML}$ | Maximum likelihood estimate of the transmitted data stream for each user |
| $\underline{\underline{D}}_k$ | Transmitted sequence convolution matrix for user (k) |
| $\underline{\underline{D}}$ | Combined transmitted sequence convolution matrix for all K users |
| R | The received sampled composite waveform |
| r(n, p) | The received complex baseband data sequence for diversity port (p) |
| $f_m(n, p)$ | $m^{th}$ frame of received data for diversity port (p) |
| $s_k(nT_n, p)$ | Actual characteristic signature responses unique to the $k^{th}$ users co-channel interfering transmission signal received by diversity port (p) and sampled at $T_n$ seconds per sample |

TABLE-continued

| SYMBOL | DESCRIPTION |
|---|---|
| $\hat{S}_k(n, p, m)$ | Estimated characteristic signature responses unique to the $k^{th}$ users co-channel interfering transmission signal received by diversity port (p) and estimated in frame (m) |
| $\hat{S}_{k_a}(n, p, m)$ | Estimated characteristic signature responses unique to the active user $k = k_a$ for diversity port (p) and estimated in frame (m) |
| $\underline{S}ML(P)$ | Maximum likelihood signature waveform stacked vector for diversity port (p) |
| $\underline{\underline{T}}_r$ | Linear transformation matrix that is applied to a section of the received waveform and used to estimate the signature responses |
| $\underline{\underline{T}}_{r_1}$ | Linear transformation matrix that is used by the Signature Waveform Estimator to calculate the initial estimates of the signature waveforms for each possible user ($k = 1, 2, \ldots, K$) |
| $\underline{\underline{T}}_{r_2}$ | Rebuilt linear transformation matrix that is used by the Signature Waveform Estimator to calculate the subsequent estimates of the signature waveforms for each active user ($k = k_1, k_2, \ldots K_A$) |
| $\hat{\sigma}(p)^2$ | Estimated noise power received from diversity port (p) |
| $\hat{\tau}_m(p)^2$ | |
| $\hat{w}_m(n, p)$ | Estimated noise sequence in the received training sequence ($\beta(n, p)$) for frame m |
| $\hat{\beta}_m(n, p)$ | Estimated received composite training sequence waveform for diversity port (p) and frame m |
| $\beta(n, p)$ | Actual composite received training sequence waveform for diversity port (p) |
| $\tau$ | Sample shift index (used in the training sequence locator algorithm) |
| $\tau_p$ | Estimated training sequence location index for diversity port (p) |
| $\tau_{TS}$ | Combined estimated training sequence location index (this is the output of the training sequence locator algorithm) |
| $C_p$ | Training sequence confidence metric for diversity port (p) |
| $d_p(\tau)$ | Training sequence detection statistic for diversity port (p) |
| $\underline{l}_m(\tau, P)$ | Training sequence search vector at sample shift ($\tau$), for received frame (m) and diversity port (p) |
| $e_m(\tau, p)$ | Energy in the $m^{th}$ training sequence search vector for sample shift ($\tau$) and diversity port (p) |
| $\rho_{ij}(\tau, p)$ | Correlation coefficient between training sequence search vectors $\underline{l}_i(\tau, p)$ and $\underline{l}_j(\tau, p)$ at sample shift ($\tau$) and diversity port (p) |
| $u_p(k)$ | Active user test results sequence for diversity port (p) NOTE: $u_p(k) = 0$ if user "k" is inactive; $u_p(k) = 1$ is user "k" is active) |
| $u(k)$ | Combined active user test results NOTE: $u(k) = 0$ if user "k" is inactive; $u(k) = 1$ if user "k" is active) |
| $\hat{P}_{k_a}(p, m)$ | Estimated received signal power for user ($k = k_a$) received by frame (m) on diversity port (p) |
| $\hat{P}_{k_a}(p)$ | Estimated received signal power for user ($k = k_a$) received on diversity port (p) averaged over all frames ($m = 1, 2, \ldots M$) |

What is claimed is:

1. A parameter estimator of a multiuser detection receiver comprising:

means for estimating a training sequence location index ($\tau_{TS}$) in each frame of a received baseband signal;

means for calculating an estimate of an average noise power ($\hat{\sigma}(p)^2$) in said received baseband signal in accordance with said training sequence location index ($\tau_{TS}$) input;

means for estimating signature waveforms ($s_K(n,p)$) unique to each user in said received baseband signal in accordance with said training sequence location index ($\tau_{TS}$) input and a transformation matrix ($\underline{\underline{T}}_r$) input;

means, coupled to an output of said estimate of an average noise power calculating means and to an output of said signature waveforms estimating means, for determining a number of active users; and means, coupled to said means for determining the number of active users and to prestored known training sequences for each user, for generating said transformation matrix ($\underline{\underline{T}}_r$) to send to said signature waveform estimating means.

2. The parameter estimator as recited in claim 1 wherein said means for calculating an estimate of an average noise power in said received baseband signal comprises:

training sequence selector means for calculating an estimate of composite training sequences ($\hat{\beta}_m(n, p)$) in each frame (m) of said received baseband signal (r(n,p)) in accordance with said training sequence location index ($\tau_{TS}$) and a known number of samples per frame (F) of said received baseband signal;

a first averager means for determining an average ($\hat{\beta}(n, p)$) of said composite training sequences ($\hat{\beta}_m(n, p)$);

means for subtracting said average ($\hat{\beta}(n, p)$) of said composite training sequences from said estimate of composite training sequences $\hat{\beta}_m(n, p)$ to obtain an estimated noise signal ($\hat{w}_m(n, p)$);

means for calculating a variance of each noise signal for estimating said average noise power ($\hat{\sigma}(p)^2$) in each frame; and a second averager means coupled to an output of said variance calculating means for determining said estimate of an average noise power from said average noise power in each frame (m).

3. The parameter estimator as recited in claim 1 wherein said means for estimating signature waveforms unique to each user in said received baseband signal for each diversity port (p) comprises:

means for selecting a received training sequence in each frame of said received baseband signal; and means for multiplying said received training sequence in each frame by said transformation matrix ($\underline{\underline{T}}_r$) to obtain said estimated signature waveforms ($s_k(n,p)$).

4. The parameter estimator as recited in claim 3 wherein said transformation matrix comprises an initial transformation matrix built from prestored known training sequences for each user for an initial matrix multiplication calculation, and said transformation matrix on subsequent matrix multiplication calculations is determined by a transformation matrix rebuilder receiving an estimate of the active users.

5. The parameter estimator as recited in claim 1 wherein said means for generating said transformation matrix comprises:

means, coupled to a memory, for building an initial transformation matrix ($\underline{\underline{T}}_{r_1}$) in response to said prestored known training sequences for each user;

means for rebuilding said transformation matrix ($\underline{\underline{T}}_r$) in response to an output of said active users determining means; and means coupled to said initial transformation matrix building means and said transformation matrix rebuilding means for selecting a transformation matrix to send to said signature waveform estimating means.

6. The parameter estimator as recited in claim 1 wherein said multiuser detection receiver comprises means for storing said known training sequence for each user.

7. A multiuser communication system comprising:

a plurality of user transmitters transmitting co-channel interfering signals;

a receiver having means for receiving a composite waveform signal from said plurality of user transmitters;

said receiver further comprises means for converting said received composite waveform signal to a received baseband signal;

means, coupled to said received baseband signal, for generating estimated signature waveforms of each user (k) for each diversity port (p) by using said received baseband signal from each diversity port in accordance with known training sequences of each of said plurality of user transmitters;

means for storing said known training sequence of each of said plurality of user transmitters; and means for demodulating said received baseband signal in accordance with information received from said estimated signature waveform generating means to generate symbols for each of said plurality of user transmitters.

8. The multiuser communication system as recited in claim 7 wherein said receiver comprises a single polarized antenna.

9. The multiuser communication system as recited in claim 7 wherein:

said receiver comprises a dual polarized antenna for reducing symbol error rate; and each polarized port of said antenna comprises said means for converting said received composite waveform signal to a received baseband signal.

10. The multiuser communication system as recited in claim 7 wherein said receiver comprises at least two polarized antennas, each of said antennas having either a single polarization or a dual polarization for reducing symbol error rate; and each polarized port of each of said antennas comprises means for converting said received composite waveform signal to a received baseband signal.

11. The multiuser communication system as recited in claim 7 wherein said means for generating estimated signature waveforms of said received baseband signal comprises:

means for estimating a training sequence location index ($\tau_{TS}$) in each frame of a received baseband signal;

means for calculating an estimate of the average noise power $\hat{\sigma}(p)^2$ in said received baseband signal in accordance with said training sequence location index ($\sigma_{TS}$) input;

means for estimating signature waveforms ($s_K(n,p)$) unique to each user in said received baseband signal in accordance with said training sequence location index ($\tau_{TS}$) input and a transformation matrix ($T_r$);

means, coupled to an output of said estimate of an average noise power calculating means and to an output of said signature waveforms estimating means, for determining a number of active users; and means, coupled to said means for determining the number of active users and to prestored known training sequences for each user, for generating said transformation matrix ($T_r$) to send to said signature waveform estimating means.

12. The multiuser communication system as recited in claim 11 wherein said means for generating said transformation matrix comprises:

means, coupled to a memory, for building an initial transformation matrix in response to said prestored known training sequences for each user;

means for rebuilding said transformation matrix in response to with an output of said active users determining means; and means coupled to said initial transformation matrix building means and said transformation matrix rebuilding means for selecting a transformation matrix to send to said signature waveform estimating means.

13. A method of estimating parameters of a received baseband signal in a multiuser detection receiver comprising the steps of:

estimating a training sequence location index in each frame of said received baseband signal;

estimating signature waveforms unique to each user in each received baseband signal in response to said training sequence location index and a transformation matrix;

determining a number of active users based on an average noise power and an estimation of said signature waveforms unique to each user in said receive baseband signal; and generating said transformation matrix based on the determined number of active users and prestored known training sequences.

14. The method as recited in claim 13 wherein said step of generating said transformation matrix comprises the steps of:

building an initial transformation matrix in response to said prestored known training sequences for each user for use during a first iteration of a signature estimation loop;

rebuilding said transformation matrix in response to the determined number of active users for use during subsequent iterations of said signature estimation loop; and selecting a transformation matrix from said initial transformation matrix iteration or said rebuilt transformation matrix iterations of said signature estimation loop, for estimating signature waveforms unique to each user.

* * * * *